US012792328B2

(12) United States Patent
Sandoz

(10) Patent No.: US 12,792,328 B2
(45) Date of Patent: *Nov. 10, 2026

(54) # APPLICATION PROGRAMMING INTERFACE FOR BUILDING AND TRANSFORMING SYMBOLIC DESCRIPTION LANGUAGE REPRESENTATIONS OF SOURCE CODE

(71) Applicant: Oracle International Corporation, Redwood Shores, CA (US)

(72) Inventor: Paul David Sandoz, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 18/524,815

(22) Filed: Nov. 30, 2023

(65) Prior Publication Data

US 2025/0045033 A1 Feb. 6, 2025

Related U.S. Application Data

(60) Provisional application No. 63/516,832, filed on Jul. 31, 2023.

(51) Int. Cl.
*G06F 8/51* (2018.01)

(52) U.S. Cl.
CPC ...................................... *G06F 8/51* (2013.01)

(58) Field of Classification Search
CPC ... G06F 8/51; G06F 8/443; G06F 8/41; G06F 8/437; G06F 8/37; G06F 8/40
See application file for complete search history.

(56) References Cited

U.S. PATENT DOCUMENTS

| | | | |
|---|---|---|---|
| 5,784,553 | A | 7/1998 | Kolawa et al. |
| 9,015,680 | B1 | 4/2015 | Shropshire |
| 10,853,041 | B2 | 12/2020 | Tsingauz et al. |
| 2005/0193359 | A1 | 9/2005 | Gupta et al. |
| 2007/0006191 | A1 | 1/2007 | Franz et al. |
| 2007/0162246 | A1 | 7/2007 | Barcia |
| 2008/0222616 | A1 | 9/2008 | Cheng et al. |
| 2012/0079465 | A1 | 3/2012 | Harvey |
| 2013/0198727 | A1 | 8/2013 | Darcy et al. |
| 2013/0247017 | A1 | 9/2013 | Bernecker |

(Continued)

OTHER PUBLICATIONS

Dockins et al., "Constructing Semantic Models of Programs with the Software Analysis Workbench", Jul. 2016, pp. 18.

(Continued)

*Primary Examiner* — Duy Khuong T Nguyen
(74) *Attorney, Agent, or Firm* — Invoke

(57) ABSTRACT

Techniques for building and transforming SDL representations of source code are disclosed, including: receiving, by an application programming interface (API), an API call including a symbolic description language (SDL) representation of a set of source code; determining, by the API based at least on the first API call, one or more transformations to perform on the SDL representation of the set of source code; generating, by the API, a transformed SDL representation at least by performing the one or more transformations on the SDL representation of the set of source code; supplying, by the API responsive to the first API call, the transformed SDL representation.

21 Claims, 18 Drawing Sheets

(56) References Cited

U.S. PATENT DOCUMENTS

| | | | |
|---|---|---|---|
| 2014/0325489 A1 | 10/2014 | Yoshida | |
| 2016/0110176 A1 | 4/2016 | Fink et al. | |
| 2016/0357533 A1 | 12/2016 | De et al. | |
| 2017/0139690 A1 | 5/2017 | Pesarese et al. | |
| 2018/0143814 A1 | 5/2018 | Bucuvalas | |
| 2019/0196939 A1 | 6/2019 | Lengauer et al. | |
| 2021/0240456 A1 | 8/2021 | Dwars et al. | |
| 2022/0067538 A1 | 3/2022 | Choudhary et al. | |
| 2022/0197617 A1 | 6/2022 | Schrammel | |
| 2022/0300264 A1* | 9/2022 | Rose | G06F 8/437 |
| 2023/0401069 A1 | 12/2023 | Chu | |

OTHER PUBLICATIONS

Rodriguez-Prieto et al., "An Efficient and Scalable Platform for Java Source Code Analysis Using Overlaid Graph Representations", IEEE Access, Apr. 29, 2020, vol. 8, pp. 72239-72260.
Amme, W., Ronne, J. V., & Franz, M. (2007). Ssa-based mobile code: Implementation and empirical evaluation. ACM Transactions on Architecture and Code Optimization (TACO), 4(2), 13-es. (Year: 2007).
Farooq, U. (2018), "Neural Machine Translation with Code", Medium.com. (Year: 2018).
Li, Y., Tan, T., & Xue, J. (2019). Understanding and analyzing java reflection. ACM Transactions on Software Engineering and Methodology (TOSEM), 28(2), 1-50. (Year: 2019).
Sampson, A. (2022). "Lesson 6: Static Single Assignment". (Year: 2022).
Innes, M. (2018). Don't unroll adjoint: Differentiating SSA-form programs. arXiv preprint arXiv: 1810.07951. (Year: 2018).
Bondhugula U., "High Performance Code Generation in MLIR: An Early Case Study with GEMM", Mar. 1, 2020, 23 Pages.
Braione et al., "JBSE: a symbolic executor for Java programs with complex heap inputs", FSE 2016: Proceedings of the 2016 24th ACM SIGSOFT International Symposium on Foundations of Software Engineering, Nov. 2016, pp. 1018-1022.
Jolly et al., "Symbolic Script Programming for Java", Oct. 26, 2018, 16 Pages.
Lattner et al., "MLIR: A Compiler Infrastructure for the End of Moore's Law", Mar. 1, 2020, 21 Pages.
Otto C., "Java Program Analysis by Symbolic Execution", Department of Computer Science, Mar. 2015, pp. 224.
P?as?areanu et al., "Symbolic PathFinder: symbolic execution of Java bytecode", ASE '10: Proceedings of the 25th IEEE/ACM International Conference on Automated Software Engineering, Sep. 2010, pp. 179-180.
Lattner et al., "MLIR: Scaling Compiler Infrastructure for Domain Specific Computation", 2021 IEEE/ACM International Symposium on Code Generation and Optimization, 2021, pp. 2-14.
Zhao et al., "Design and implementation of DeepDSL: A DSL for deep learning", Computer Languages, Systems & Structures, vol. 54, Apr. 25, 2018, pp. 39-70.

* cited by examiner

FIG. 7A

700

```
Body.Constructor body = Body.Constructor.of(
        MethodTypeDesc.methodType(int.class, int.class, int.class));
```

FIG. 7B

702

```
// Obtain the entry block builder of the body
Block.Builder block = body.entryBlock();
// Obtain the entry block parameters (corresponding to the signature)
Block.Parameter a = block.parameters().get(0);
Block.Parameter b = block.parameters().get(1);
// Create the add operation accepting the block parameters as operands
CoreOps.BinaryOp addop = CoreOps.add(a, b);
// Insert the add operation into the entry block, which gives an operation result
Op.Result r = block.op(addop);
// Insert a return operation into the entry block,
// whose operand is the result of the add operation
block.op(CoreOps._return(r));
```

FIG. 7C

704

```
// Create the function operation from the body,
// which closes the body and any block builders
CoreOps.FuncOp f = CoreOps.func("f", body);
```

FIG. 7D

706

```
FuncOp(String funcName, Body.Constructor bodyC) {
    super(NAME, TypeDesc.VOID,
            List.of());

    this.funcName = funcName;
    this.body = bodyC.construct(this);
}
```

FIG. 7E

708

```
@CodeReflection
static int f(int a, int b) {
    return a + b;
}
```

FIG. 7F

710

```
CoreOps.FuncOp f = CoreOps.func("f",
                MethodTypeDesc.methodType(int.class, int.class, int.class))
        .body((Block.Builder block) -> {
            // Obtain the entry block parameters (corresponding to the signature)
            Block.Parameter a = block.parameters().get(0);
            Block.Parameter b = block.parameters().get(1);
            // Create the add operation accepting the block parameters as operands
            CoreOps.BinaryOp addop = CoreOps.add(a, b);
            // Insert the add operation into the entry block,
            // which gives an operation result
            Op.Result r = block.op(addop);
            // Insert a return operation into the entry block,
            // whose operand is the result of the add operation
            block.op(CoreOps._return(r));
        }); // block is closed
```

FIG. 7G

712

```
public FuncOp body(Consumer<Block.Builder> c) {
    Body.Constructor body = Body.Constructor.of(funcDescriptor);
    c.accept(body.entryBlock());
    return new FuncOp(funcName, body);
}
```

FIG. 7H

714

```
static int f(int i) {
    IntUnaryOperator fi = li -> {
        return i + li;
    };

    int fortyTwo = 42;
    int or = fi.applyAsInt(fortyTwo);
    return or;
}

FuncOp f = func("f", methodType(int.class, int.class))
        .body(block -> {
            Block.Parameter i = block.parameters().get(0);

            // functional descriptor = (int)int
            // op descriptor = ()IntUnaryOperator
            //   captures i
            LambdaOp lambda = lambda(
                    methodType(int.class, int.class), type(IntUnaryOperator.class))
                    .body(lblock -> {
                        Block.Parameter li = lblock.parameters().get(0);

                        lblock.op(_return(
                                lblock.op(add(i, li))));
            });

    Op.Result fi = block.op(lambda);
    Op.Result fortyTwo = block.op(constant(INT, 42));
    Op.Result or = block.op(call(INT_UNARY_OPERATOR_METHOD, fi, fortyTwo));
    block.op(_return(or));
});
```

FIG. 7I

716

```
public abstract Op transform(CopyContext cc, OpTransformer ot);
```

FIG. 7J

718

```
@FunctionalInterface
public interface OpTransformer extends BiFunction<Block.Builder, Op, Block.Builder> {
    Block.Builder apply(Block.Builder block, Op op);
}
```

FIG. 7K

720

```
CoreOps.FuncOp fcopy = f.transform(new CopyContext(),
        (Block.Builder block, Op op) -> {
            block.op(op);
            return block;
        });
```

FIG. 7L

722

```
public Op.Result op(Op opToAppend) {
    return op(opToAppend, ot);
}

public Op.Result op(Op opToTransform, OpTransformer transformer) {
    // Check if scope is alive
    check();
    // Check if operation is bound
    final Op.Result oprToTransform = opToTransform.result();

    Op transformedOp = opToTransform;
    if (oprToTransform != null) {
        // If operation is bound, then copy it and transform its contents
        transformedOp = opToTransform.transform(cc, transformer);
    }

    Op.Result transformedOpr = insertOp(transformedOp);

    if (oprToTransform != null) {
        // If operation is bound, then map result to transformed result
        cc.putValueIfAbsent(oprToTransform, transformedOpr);
    }

    return transformedOpr;
}
```

FIG. 7M

724

```
void foo(int i) {
    System.out.println("FOO: " + i);
}

void bar(int i) {
    System.out.println("BAR: " + i);
}

void fooCall(int i) {
    Consumer<Integer> c = v -> {
        foo(v);
        foo(v);
    };
    c.accept(i);
    foo(i);
}

CoreOps.FuncOp fooCall = ...;  // description of methof `fooCall`
MethodDesc foo = MethodDesc.method(TestTransform.class, "foo", void.class, int.class);
MethodDesc bar = MethodDesc.method(TestTransform.class, "bar", void.class, int.class);

CoreOps.FuncOp barCall = fooCall.transform((block, op) -> {
    // Match on calls to foo
    if (op instanceof CoreOps.CallOp cop && cop.callDescriptor().equals(foo)) {
        List<Value> fooArgs = cop.operands();
        // Map foo's arguments to bar's arguments
        List<Value> barArgs = block.context().getValues(fooArgs);

        // Add the call to bar (replacing the call to foo)
        Op.Result barResult = block.op(CoreOps.call(bar, barArgs));

        // Map foo's result to bar's result (replacing foo's result)
        Op.Result fooResult = cop.result();
        block.context().putValue(fooResult, barResult);
    } else {
        block.op(op);
    }
    return block;
});
```

FIG. 7N

726

```
FuncOp(FuncOp that, CopyContext cc, OpTransformer oa) {
    this(that, that.funcName, cc, oa);
}

FuncOp(FuncOp that, String funcName, CopyContext cc, OpTransformer ot) {
    super(that, cc);

    this.funcName = funcName;
    this.body = that.body.transform(cc, ot).construct(this);
}

@Override
public FuncOp transform(CopyContext cc, OpTransformer ot) {
    return new FuncOp(this, cc, ot);
}
```

FIG. 7O

728

```
public Body.Constructor transform(CopyContext cc, OpTransformer ot) {
    Body.Constructor body = Body.Constructor.of(name, descriptor(), cc);
    body.entryBlock().transformBody(this, body.entryBlock().parameters(), ot);
    return body;
}
```

FIG. 7P

730

```
/**
 * Transforms a body into this block.
 * <p>
 * First, the input block parameters of the body's entry block are mapped to the given
 * arguments, and the entry block is mapped to a block builder equivalent to this
 * block builder but associated with the given operation transformer and this
 * builder's copy context.
 * <p>
 * Second, for each input block in the body (except the entry block) an output block
 * builder is created with equivalent parameters as the input block and with the given
 * operation transformer and this builder's copy context.
 * The parameters of the input block are mapped to the parameters of the output block
 * builder, and the input block is mapped to the output block builder.
 * <p>
 * Third, for each input block in the body (in order) the input block's operations are
 * transformed (in order). The first operation is transformed by applying
 * corresponding output block builder and the operation to the
 * given operation transformer.
 * The second operation and subsequent operations, if any, are transformed by applying
 * the result of the prior transformation and the current operation to the given
 * operation transformer.
 * <p>
 * If after transformation an output block builder contains no operations then it is
 * elided.
 *
 * @param bodyToTransform the body to transform.
 * @param args            the list of values to map to the parameters of the body's
 *                        entry block
 * @param ot              the operation transformer.
 */
public void transformBody(Body bodyToTransform, List<? extends Value> args,
                          OpTransformer ot) {
```

FIG. 7Q

732

```
CoreOps.FuncOp lf = f.transform((block, op) -> {
    if (op instanceof Op.Lowerable lop) {
        return lop.lower(block);
    } else {
        block.op(op);
        return block;
    }
});
```

FIG. 7R

734

```
public Block.Builder lower(Block.Builder b, OpTransformer opT) {
    Block.Builder header = b.block("header");
    Block.Builder body = b.block("body");
    Block.Builder exit = b.block("exit");

    b.op(br(header.successor()));

    header.transformBody(predicateBody(), List.of(), opT.andThen((block, op) -> {
        if (op instanceof CoreOps.YieldOp yo) {
            block.op(cond_br(block.context().getValue(yo.yieldValue()),
                    body.successor(), exit.successor()));
        } else if (op instanceof Lowerable lop) {
            block = lop.lower(block, opT);
        } else {
            block.op(op);
        }
        return block;
    }));

    setBranchTarget(b.context(), this, new BranchTarget(exit, header));

    body.transformBody(loopBody(), List.of(), opT.andThen((block, op) -> {
        if (op instanceof Lowerable lop) {
            block = lop.lower(block, opT);
        } else {
            block.op(op);
        }
        return block;
    }));

    return exit;
}
```

FIG. 7S

736

```
Quoted q = (int a, int b) -> a + b;
CoreOps.ClosureOp cop = (CoreOps.ClosureOp) q.op();

// Rather than writing the code to build the lambda expression quoted above
// we can inline it, replacing the block parameters
CoreOps.FuncOp f = func("f", methodType(int.class, int.class, int.class))
        .body(block -> {
            Block.Parameter a = block.parameters().get(0);
            Block.Parameter b = block.parameters().get(0);

            // Inlining is composed of body transformation
            block.inline(cop, List.of(a, b), Block.Builder.INLINE_RETURN);
        });
```

APPLICATION PROGRAMMING INTERFACE FOR BUILDING AND TRANSFORMING SYMBOLIC DESCRIPTION LANGUAGE REPRESENTATIONS OF SOURCE CODE

INCORPORATION BY REFERENCE; DISCLAIMER

The following application is hereby incorporated by reference: Application No. 63/516,832 filed on Jul. 31, 2023. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to modeling source code. In particular, the present disclosure relates to modeling Java source code in a symbolic description language.

BACKGROUND

In general, a Java compiler receives Java source code and generates bytecode compiled to the specification of the Java Virtual Machine (JVM). In the process of compiling the source code, much of the information included in the source code can be lost. For example, Java bytecode does not preserve language constructs such as lambda expressions, try/catch/finally blocks, loops, patterns, etc.

Code reflection is the process of inspecting code at runtime (i.e., during execution of the bytecode by the JVM), to determine one or more properties of the code. For example, given a runtime object of an unknown type, reflection operations may determine the type name and whether the type includes a particular method. Generally, reflection generally allows only for a runtime query to obtain the "surface" details of a class, such as: the type of the class itself; its fields; its method declarations; etc. The code of a method body itself is opaque and cannot be queried via reflection.

In some cases, due to the limitations of reflection, developers may resort to ad-hoc solutions to attempt to obtain more information. For example, a developer may write code to obtain the bytecode of a method. Because the Java platform does not provide any standard way to access the bytecode of a method, such approaches must be ad hoc and/or platform dependent. Even then, bytecode is designed for execution by the Java Virtual Machine, and the process of compiling source code to bytecode destroys information such as structures and types. In addition, different Java compiler implementations use different translation strategies, resulting in different bytecodes even though the program meaning is preserved across compilers in accordance with the Java specifications. Because bytecode does not preserve all language constructs, approaches that rely on bytecode are limited to information that is not destroyed in the compilation to bytecode. Moreover, such ad-hoc solutions are not generalizable to other situations and may require modifying the compiler itself.

In view of the above, the information available to Java programs via reflection (including ad-hoc solutions) often is insufficient for the desired purpose. For example, reflection does not provide sufficient information to generate new code that preserves the originating code's language structures.

Reflection also does not provide sufficient information to generate transformations of original programs, such as differentiated programs, optimized programs, functionally similar programs compiled according to different language specifications, etc.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment and mean at least one. In the drawings:

FIGS. 7A-7S illustrate examples of building and transforming SDL representations of source code in accordance with one or more embodiments.

DETAILED DESCRIPTION

Figure 1:
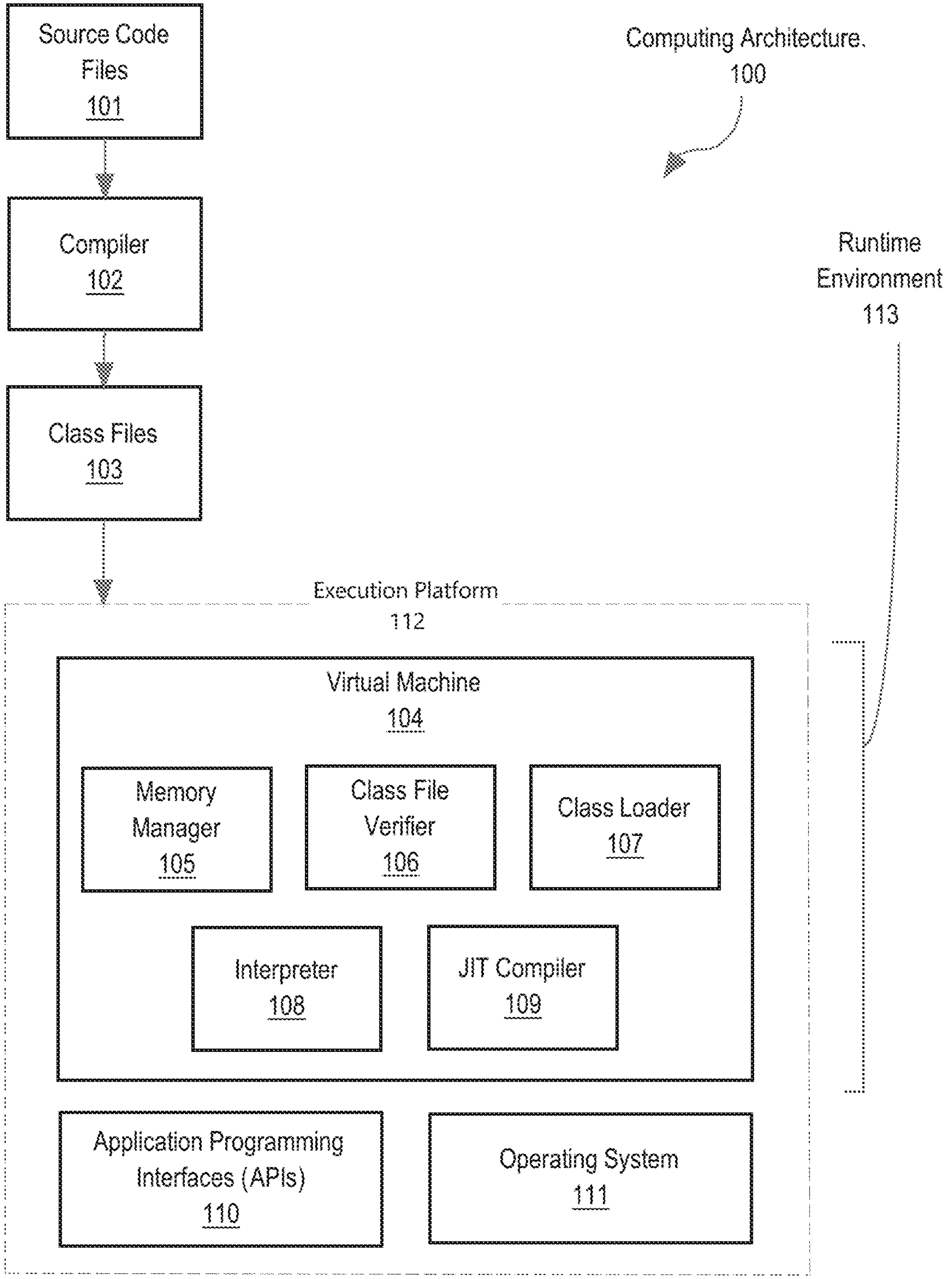
FIG. 1 illustrates an example computing architecture in which techniques described herein may be practiced.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

1. GENERAL OVERVIEW
2. ARCHITECTURAL OVERVIEW
  2.1. EXAMPLE ARCHITECTURE
  2.2. EXAMPLE CLASS FILE STRUCTURE
  2.3. EXAMPLE VIRTUAL MACHINE ARCHITECTURE
  2.4. LOADING, LINKING, AND INITIALIZING
3. EXAMPLE SYSTEM
  3.1. SYSTEM COMPONENTS
  3.2. DATA STORAGE
  3.3. USER INTERFACE
  3.4. TENANTS
  3.5. MACHINE LEARNING
  3.6. HIGH-LEVEL AND LOWER-LEVEL APIS
4. BUILDING AND TRANSFORMING SDL REPRESENTATIONS OF SOURCE CODE
  4.1. BUILDING SYMBOLIC DESCRIPTIONS 4.2. TRANSFORMING SYMBOLIC DESCRIPTIONS
5. EXAMPLE EMBODIMENT
5.1. BUILDING SYMBOLIC DESCRIPTIONS
5.2. TRANSFORMING SYMBOLIC DESCRIPTIONS
5.2.1. LOWERING SYMBOLIC DESCRIPTIONS
5.2.2. INLINING
6. PRACTICAL APPLICATIONS, ADVANTAGES, AND IMPROVEMENTS
7. COMPUTER NETWORKS AND CLOUD NETWORKS
8. MICROSERVICE APPLICATIONS
8.1. TRIGGERS
8.2. ACTIONS
9. HARDWARE OVERVIEW
10. MISCELLANEOUS; EXTENSIONS

1. General Overview

One or more embodiments provide an application programming interface (API) for building and transforming SDL representations of source code, such as Java source code. The API is configured to receive an API call including an SDL representation of a set of source code, perform one or more transformations on the SDL representation, and return a transformed SDL representation. For example, a transformation may lower SDL from a high-level SDL dialect to a low-level SDL dialect and/or inline an anonymous function such as a lambda expression or closure. The original SDL representation may be treated as immutable, so that transforming the SDL representation generates a new data structure without directly modifying the original data structure. The same API may also include one or more API endpoints for generating new SDL representations for given sets of source code.

In an embodiment, the API includes multiple lower-level API endpoints and one or more higher-level API endpoints. The lower-level API endpoints provide direct access to low-level manipulations of the SDL. A higher-level API endpoint provides access to higher-level manipulations that are composed of two or more of the lower-level manipulations. Thus, while a consumer may make a single API call to a higher-level API endpoint, the higher-level API endpoint may in turn access the lower-level API endpoints to perform a composite manipulation.

Additional techniques for generating and transforming SDL are described in U.S. patent application Ser. No. 18/168,025, filed Feb. 13, 2023, and U.S. patent application Ser. No. 18/168,161, filed Feb. 13, 2023, both of which are incorporated herein by reference in their entirety.

One or more embodiments described in this Specification and/or recited in the claims may not be included in this General Overview section.

2. Architectural Overview

2.1 Example Architecture

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
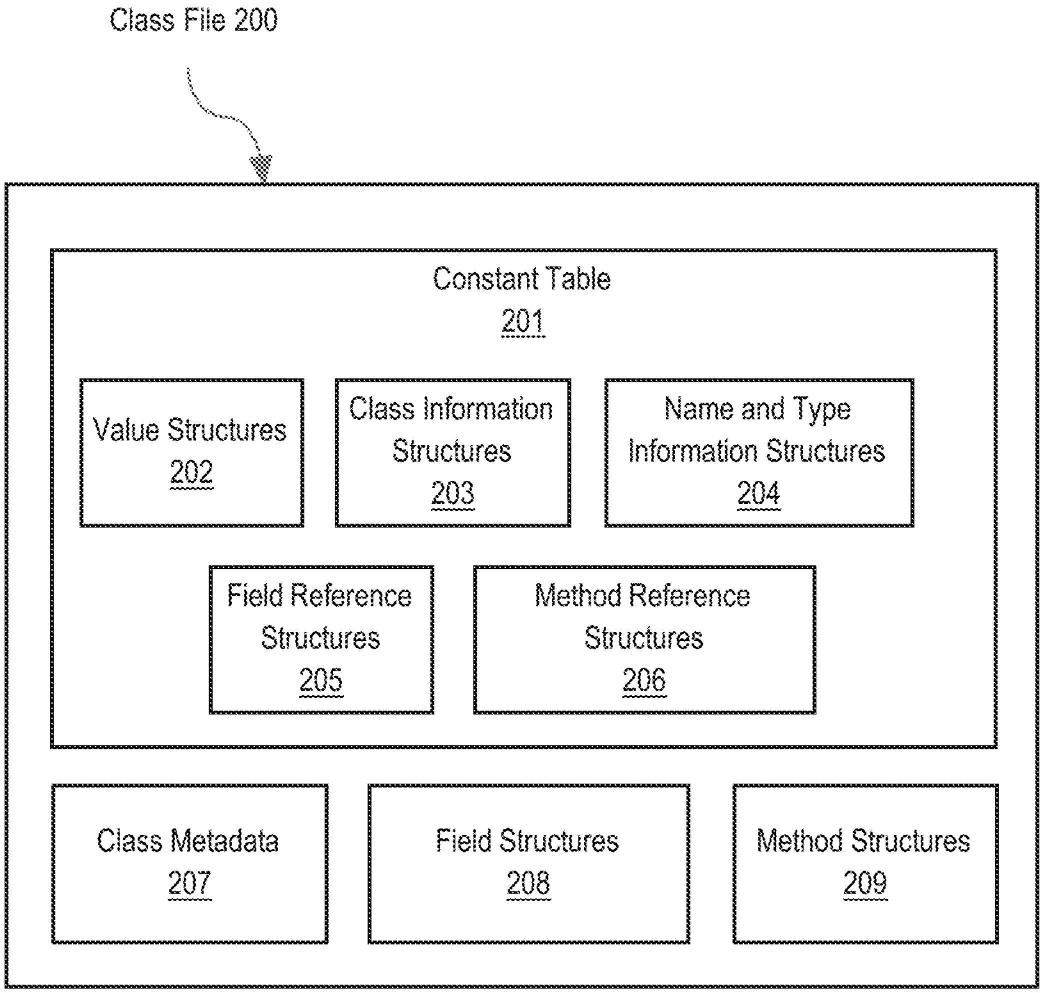
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13 ( ) {
    return B.addTwo (12, 13);
  }
}
```

In the above example, the Java method add12and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I) I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
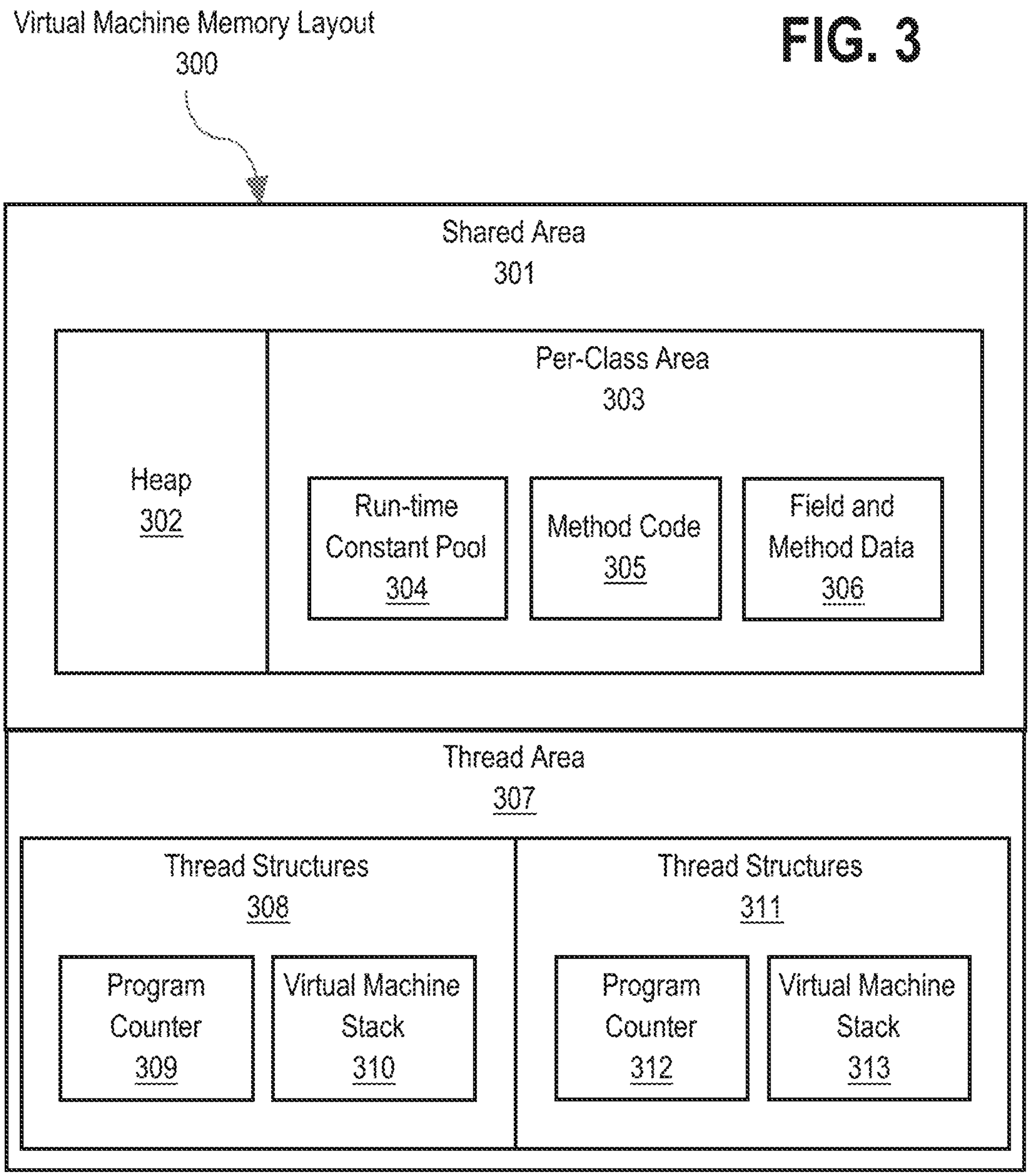
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
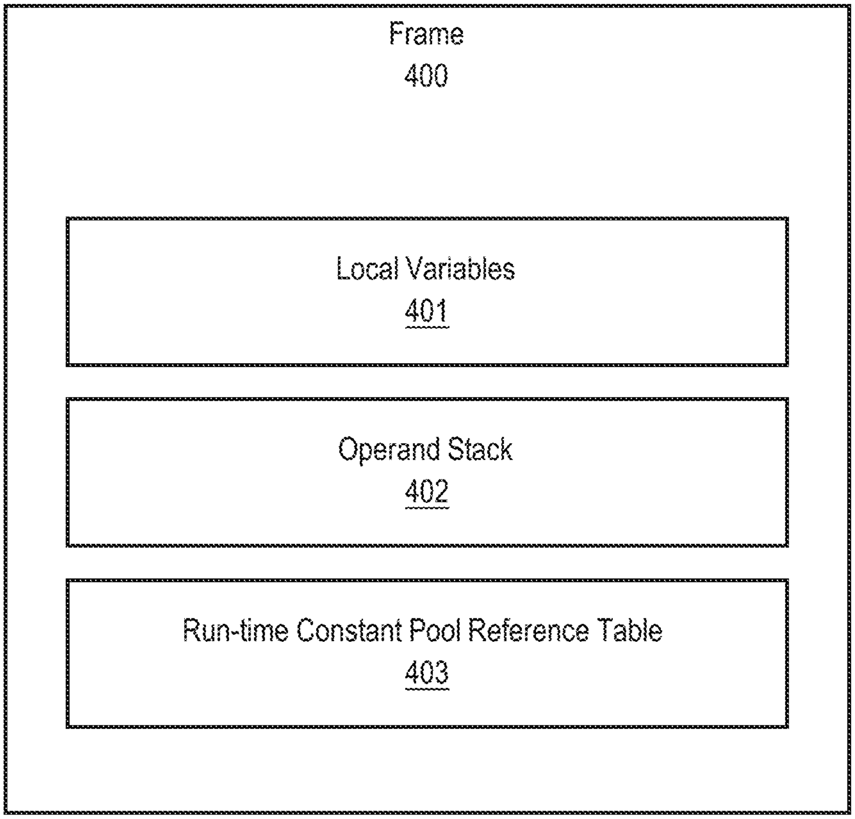
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform “lazily”) one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Example System

3.1. System Components

Figure 5A:
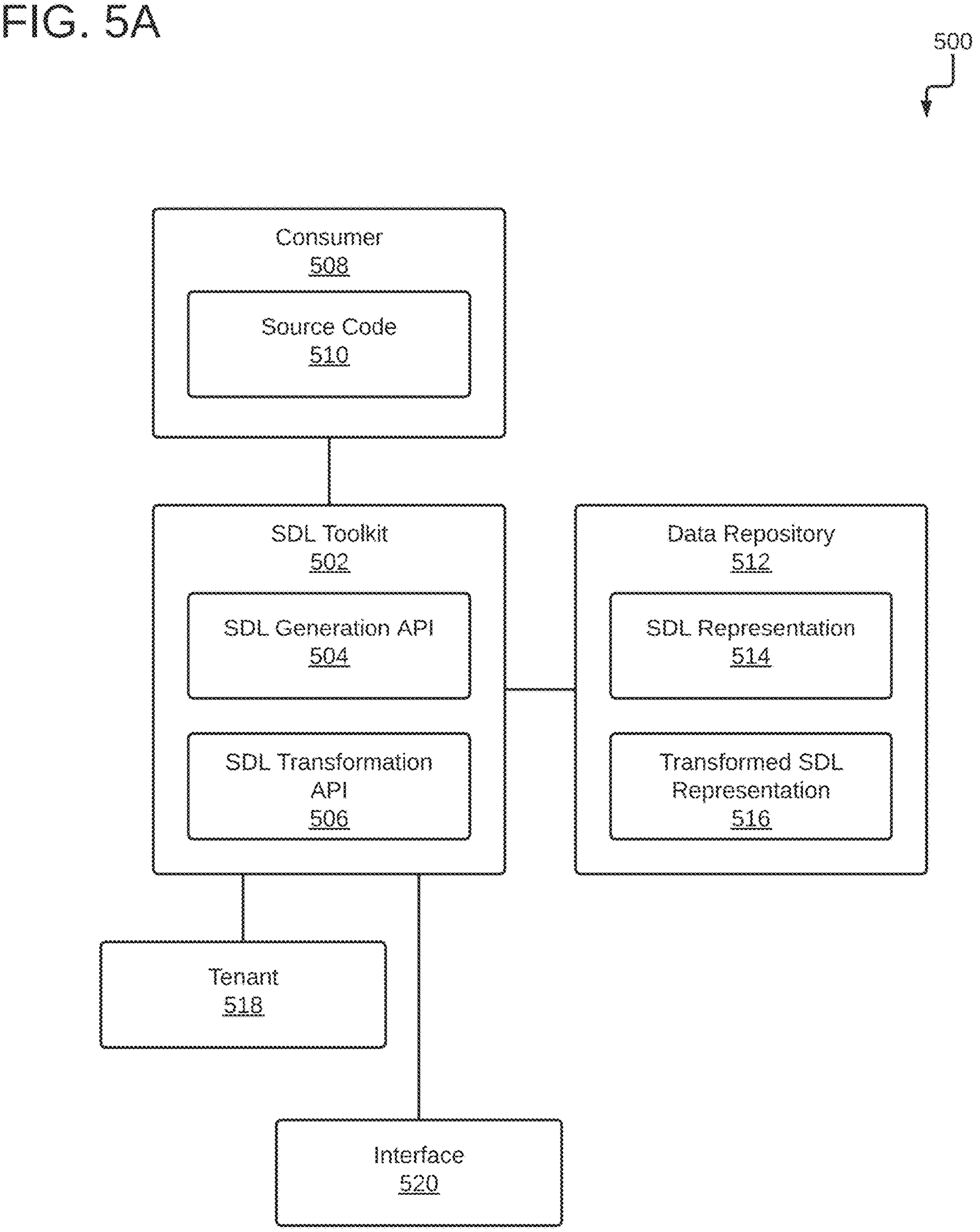
FIGS. 5A-5B illustrate an example of a system in accordance with one or more embodiments.
Figure 5B:
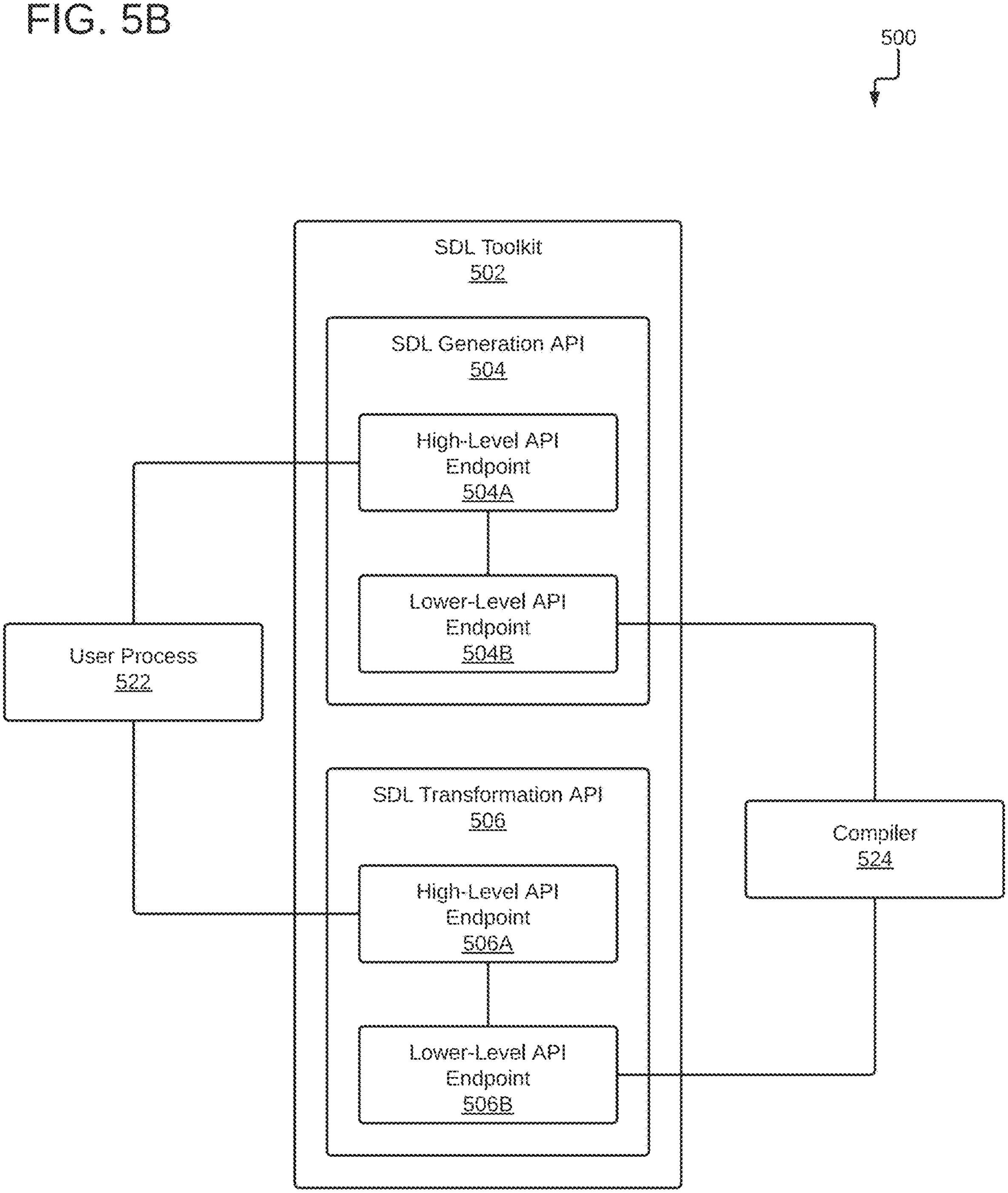

FIG. 5A-5B illustrates an example of a system 500 in accordance with one or more embodiments. As illustrated in FIG. 5A, the system 500 includes an SDL toolkit 502, one or more consumers 508, a data repository 512, one or more tenants 518, an interface 520, and various components thereof. SDL toolkit 502 includes an SDL generation API 504 and an SDL transformation API 506. Data repository 512 is configured to store one or more SDL representations 514 and one or more transformed SDL representations 516. As illustrated in FIG. 5B, SDL generation API 504 includes one or more high-level API endpoints 504A and one or more lower-level API endpoints 504B. SDL transformation API 506 includes one or more high-level API endpoints 506A and one or more lower-level API endpoints 506B. The system 500 further includes a user process 522 and a compiler 524. Each of these components is described in further detail below.

In an embodiment, the system 500 may include more or fewer components than the components illustrated in FIGS. 5A-5B. The components illustrated in FIGS. 5A-5B may be local to or remote from each other. The components illustrated in FIGS. 5A-5B may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, SDL toolkit 502 refers to hardware and/or software configured to perform operations for building and transforming SDL representations of source code, examples of which are described below. SDL toolkit 502 includes an SDL generation API 504, which is configured to generate an SDL representation 514 of source code 510. SDL generation API 504 may obtain the source code 510 via an API call, by a consumer 508, to SDL generation API 504. SDL toolkit 502 further includes an SDL transformation API 506, which is configured to generate a transformed SDL representation 516 of an SDL representation 514. SDL transformation API 506 may obtain the SDL representation 514 via an API call, by a consumer 508, to SDL transformation API 506. Alternatively or additionally, SDL transformation API 506 may obtain an SDL representation 514 directly from SDL generation API 504.

In an embodiment, SDL transformation API 506 is configured to use SDL generation API 504 to generate a transformed SDL representation 516. SDL generation API 504 and/or SDL transformation API 506 may include one or more high-level API endpoints, which may in turn access lower-level API endpoints. Thus, the operations performed by a high-level API endpoint may be composed of calls to multiple lower-level API endpoints. Some consumers 508 may call only high-level API endpoints, whereas other consumers 508 may call lower-level API endpoints directly. For example, an end user (e.g., a programmer) may rely on high-level API endpoints for ease of use, whereas a compiler may use the lower-level API endpoints for greater direct control over SDL generation and transformation. High-level and lower-level APIs are described in further detail below with respect to FIG. 5B.

In an embodiment, one or more components of the system 500 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3.2. Data Storage

In an embodiment, a data repository 512 is any type of storage unit and/or device (e.g., a file system, database, collection of tables, and/or any other storage mechanism) for storing data. As illustrated in FIG. 5A, the data repository 512 may be configured to store an SDL representation 514 and a transformed SDL representation 516, each of which is discussed in further detail herein. For example, data repository 512 may be one or more class files configured to store SDL representation 514 and/or transformed SDL representation 516. The class file(s) may in turn be stored in another kind of data repository.

The data repository 512 may include multiple different storage units and/or devices. The multiple different storage units and/or devices may or may not be of the same type or located at the same physical site. The data repository 512 may be implemented or executed on the same computing system as SDL toolkit 502 and/or on a computing system separate from SDL toolkit 502. The data repository 512 may be communicatively coupled to SDL toolkit 502 via a direct connection or via a network. Information describing an SDL representation 514 and a transformed SDL representation 516 may be implemented across any of the components of the system 500. However, this information is illustrated within the data repository 512 for purposes of clarity and explanation.

3.3. User Interface

In an embodiment, interface 520 refers to hardware and/or software configured to facilitate communications between a user and SDL toolkit 502. Interface 520 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 520 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 520 is specified in one or more other languages, such as Java, Python, C, or C++.

3.4. Tenants

In an embodiment, a tenant 518 is a corporation, organization, enterprise, or other entity that accesses a shared computing resource, such as SDL toolkit 502. The system 500 may include multiple tenants 518 that are independent from each other, such that a business or operation of one tenant is separate from a business or operation of another tenant. In an embodiment, consumer 508 is a tenant 518 and SDL toolkit 502 is provide as a software-as-a-service (SaaS) product.

3.5. Machine Learning

One or more embodiments may use machine learning to build and transform SDL representations of source code. In an embodiment, a machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. The training data may be updated based on, for example, feedback on the accuracy of the current target model. Updated training data may be fed back into the machine learning algorithm, which may in turn update the target model.

The machine learning algorithm may generate the target model such that the target model best fits the datasets of the training data to the labels of the training data Specifically, the machine learning algorithm may generate the target model such that when the target model is applied to the datasets of the training data, a maximum number of results determined by the target model match the labels of the training data. Different target models may be generated based on different machine learning algorithms and/or different sets of training data.

The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

3.6. High-Level and Lower-Level Apis

As discussed above, SDL generation API 504 and/or SDL transformation API 506 may include one or more high-level API endpoints, which may in turn access lower-level API endpoints. Thus, the operations performed by a high-level API endpoint may be composed of calls to multiple lower-level API endpoints. Some consumers 508 may call only high-level API endpoints, whereas other consumers 508 may call lower-level API endpoints directly. For example, an end user (e.g., a programmer) may rely on high-level API endpoints for ease of use, whereas a compiler may use the lower-level API endpoints for greater direct control over SDL generation and transformation.

Specifically, as illustrated in FIG. 5B, SDL generation API 504 may include one or more high-level API endpoints 504A and one or more lower-level API endpoints 504B. SDL transformation API 506 may include one or more high-level API endpoints 506A and one or more lower-level API endpoints 506B. In FIG. 5B, examples of consumers include one or more user processes 522 and one or more compilers 524.

3.6.1. High-Level and Lower-Level SDL Generation Api Endpoints

Referring to SDL generation API 504, a high-level API endpoint 504A is an API endpoint that provides access to comparatively high-level SDL generation functionality. For example, a high-level API endpoint 504A may be configured to generate an SDL representation based on a source code file. The high-level API endpoint 504A may accept, as input, the source code file. The high-level API endpoint 504A may further accept, as input, one or more parameters that allow for a limited amount of customization. For example, the high-level API endpoint 504A may accept a parameter that indicates whether to generate the SDL representation using a high-level SDL dialect or a low-level SDL dialect. Alternatively or additionally, the high-level API endpoint 504A may be configured to use one or more default and/or predefined configuration parameters. For example, the high-level API endpoint 504A may be configured to always generate SDL representations using a high-level SDL dialect. Alternatively or additionally, SDL generation API 504 may include separate high-level API endpoints 504A for generating SDL representations in a high-level SDL dialect or a low-level SDL dialect, respectively.

Still referring to SDL generation API 504, a lower-level API endpoint 504B is an API endpoint that provides access to comparatively low-level SDL generation functionality. For example, a lower-level API endpoint 504B may be configured to generate an SDL representation of a specific kind of code structure, such as a lambda expression, a try/catch/finally block, a loop, a pattern, or another kind of code structure. SDL generation API 504 may include multiple lower-level API endpoints 504B corresponding to the different kinds of code structures, respectively. Collectively, the lower-level API endpoints 504B may include all the operations needed to generate a full SDL representation of a set of source code. In addition, different lower-level API endpoints 504B may be configured to generate SDL representations using different SDL dialects. For example, one lower-level API endpoint 504B may be configured to generate an SDL representation of a loop in a high-level SDL dialect, and another lower-level API endpoint 504B may be configured to generate an SDL representation of a loop in a low-level SDL dialect.

As noted above, the operations performed by a high-level API endpoint 504A may be composed of calls to multiple lower-level API endpoints 504B. For example, if a consumer calls a high-level API endpoint 504A to generate an SDL representation of source code in a high-level SDL dialect, the high-level API endpoint 504A may be configured to parse the source code into different code structures (e.g., lambda expressions, try/catch/finally blocks, loops, patterns, etc.), call the corresponding lower-level API endpoints 504B to generate SDL representations of each code structure, and assemble the results returned by each lower-level API endpoint 504B into a single SDL representation of the entire set of source code. If a lower-level API endpoint 504B requires a configuration parameter as input, the high-level API endpoint 504A may be configured to supply default and/or predefined configuration parameters, even if those parameters were not supplied as input to the high-level API endpoint 504A. However, a consumer that calls the same lower-level API endpoint 504B directly may supply one or more configuration parameters that is/are different than the default and/or predefined configuration parameters. Thus, a lower-level API endpoint 504B provides more granular control over the SDL generation process, while a high-level API endpoint 504A shields consumers from needing to manage—and perhaps without even needing to be aware of—that level of granularity.

3.6.2. High-Level and Lower-Level SDL Transformation API Endpoints

Referring to SDL transformation API 506, a high-level API endpoint 506A is an API endpoint that provides access to comparatively high-level SDL transformation functionality. For example, a high-level API endpoint 506A may be configured to transform an SDL representation from a high-level SDL dialect to a low-level SDL dialect. The high-level API endpoint 506A may accept, as input, an SDL representation in a high-level SDL dialect. The high-level API endpoint 506A may further accept, as input, one or more parameters that allow for a limited amount of customization. Alternatively or additionally, the high-level API endpoint 506A may be configured to use one or more default and/or predefined configuration parameters. Alternatively or additionally, SDL transformation API 506 may include separate high-level API endpoints 506A for transforming SDL representations according to different configurations, respectively.

Still referring to SDL transformation API 506, a lower-level API endpoint 506B is an API endpoint that provides access to comparatively low-level SDL transformation functionality. For example, a lower-level API endpoint 506B may be configured to transform an SDL representation of a specific kind of code structure, such as a lambda expression, a try/catch/finally block, a loop, a pattern, or another kind of code structure. SDL transformation API 506 may include multiple lower-level API endpoints 506B corresponding to the different kinds of code structures, respectively. Collectively, the lower-level API endpoints 506B may include all the operations needed to transform a full SDL representation. In addition, different lower-level API endpoints 506B may be configured to transform SDL representations using different SDL dialects. For example, one lower-level API endpoint 506B may be configured to perform a transformation on a high-level SDL representation of a loop, and another lower-level API endpoint 506B may be configured to perform a transformation on a low-level SDL representation of a loop.

As noted above, the operations performed by a high-level API endpoint 506A may be composed of calls to multiple lower-level API endpoints 506B. For example, if a consumer calls a high-level API endpoint 506A to transform an SDL representation from a high-level SDL dialect to a low-level SDL dialect, the high-level API endpoint 506A may be configured to parse the high-level SDL representation into segments corresponding to different code structures (e.g., high-level SDL representations of lambda expressions, try/catch/finally blocks, loops, patterns, etc.), call the corresponding lower-level API endpoints 506B to obtain low-level SDL representations of each code structure, and assemble the results returned by each lower-level API endpoint 506B into a single SDL representation in the low-level SDL dialect.

In an embodiment, if a lower-level API endpoint 506B requires a configuration parameter as input, the high-level API endpoint 506A may be configured to supply default and/or predefined configuration parameters, even if those parameters were not supplied as input to the high-level API endpoint 506A. However, a consumer that calls the same lower-level API endpoint 506B directly may supply one or more configuration parameters that is/are different than the default and/or predefined configuration parameters. Thus, a lower-level API endpoint 506B provides more granular control over the SDL transformation process, while a high-level API endpoint 506A shields consumers from needing to manage—and perhaps without even needing to be aware of—that level of granularity.

3.6.3. Consumer Access to API Endpoints

As noted above, some consumers may call only high-level API endpoints, whereas other consumers may call lower-level API endpoints directly. In the example of FIG. 5B, a user process 522 is configured to access high-level API endpoint(s) 504A of SDL generation API 504 and high-level API endpoint(s) 506A of SDL transformation API 506. This approach allows a user (e.g., an application developer) to make use of SDL generation and/or transformation functionality without requiring the user to be versed in the granular details of how those processes operate. In general, the high-level API endpoints 504A may be configured to provide access to the most common high-level SDL generation and/or transformation operations. A consumer that requires more granular control over SDL generation and/or transformation, beyond what is provided by the high-level API endpoints 504A, may be required to use the lower-level API endpoints. As one example, a compiler 524 may be configured to generate SDL representations in which loops are represented differently than what is supported by the high-level and low-level API endpoints. Given a set of source code, the compiler 524 may call the corresponding lower-level API endpoints 504B for all code structures except for any loops. The compiler 524 may generate its own form of SDL representations of the loops and combine those with the output of the lower-level API endpoints 504B. Thus, the compiler 524 is able to take advantage of SDL toolkit 502 while still generating output that is not fully supported by SDL toolkit 502.

3.6.4. Preserving Program Meaning

One or more embodiments allow a consumer (e.g., a user process or compiler) to choose whether to preserve the program meaning of the original input (e.g., source code or SDL representation). For example, a Java compiler may eventually generate bytecode that has the same program meaning as the Java program represented in source code. As another example, a user process may generate Open Computing Language (OpenCL) C99 code, which does not preserve any program meaning and is not a Java program. OpenCL C99 nonetheless preserves enough information for the program's "intent" to run, for example, on a graphical processing unit (GPU).

4. Building and Transforming SDL Representations of Source Code

Figure 6:
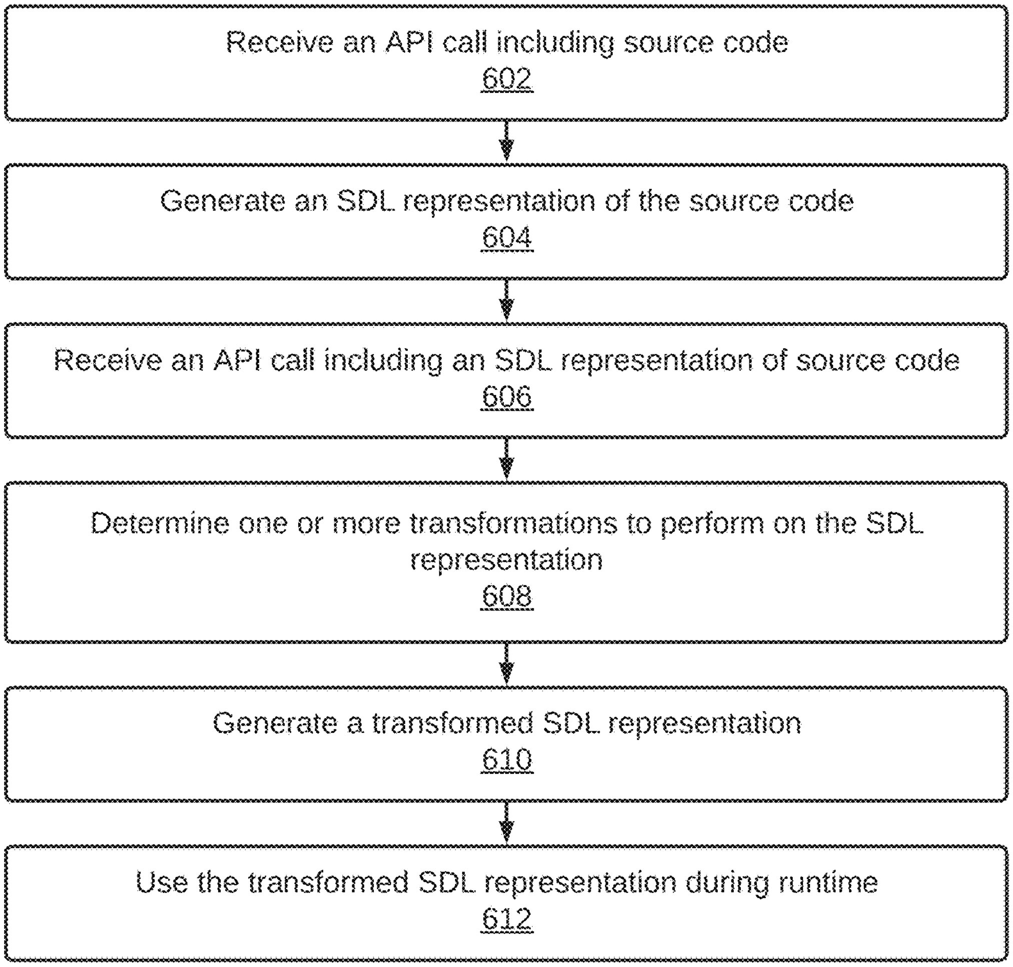
FIG. 6 illustrates an example set of operations for building and transforming SDL representations of source code in accordance with one or more embodiments.

FIG. 6 illustrates an example set of operations for building and transforming SDL representations of source code in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

4.1. Building Symbolic Descriptions

In an embodiment, an SDL generation API receives an API call that includes source code (Operation 602). Responsive to the API call, the API generates an SDL representation of the source code (Operation 604). Some examples of generating an SDL representation are described in further detail below. The API may return the SDL representation responsive to the API call (not shown in FIG. 6) or, if indicated by the API call, may proceed to transform the SDL using the SDL transformation API.

4.2. Transforming Symbolic Descriptions

In an embodiment, an SDL transformation API receives an API call that includes an SDL representation of source code (Operation 606). Based at least on the contents of the API call, the API determines one or more transformations to perform on the SDL representation (Operation 608). The API proceeds to generate a transformed SDL representation (Operation 610) by performing the indicated transformations. The transformed SDL representation may then be used, for example, at runtime (Operation 612).

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Specifically, FIGS. 7A-7S illustrate examples of building and transforming SDL representations of source code in accordance with one or more embodiments. One or more embodiments build and transform immutable in-memory forms of symbolic descriptions using an API as described herein. The following discussion includes examples of building symbolic descriptions using a builder API. In addition, the builder API may be composed with a functional transformation API that transforms pre-built symbolic descriptions to new symbolic descriptions.

In the following discussion, examples of source code are provided in the Java programming language. Alternatively, another programming language may be used. One or more embodiments should not be considered limited to the Java programming language.

5.1. Building Symbolic Descriptions

To build symbolic descriptions, one or more embodiments build bodies, blocks, and operations, and connect them together. In these examples, the structure of a symbolic description includes one or more operations. An operation includes zero or more bodies. A body includes one or more blocks. A block includes one or more operations. A block may be associated with block parameters (values), and an operation produces an operation result (a value). An operation has zero or more operands that are values (block parameters or operation results).

In an embodiment, the builder API generates an in-memory tree of op→body*→block+=→op*, where each op may use results of prior operations or block parameters. Building a symbolic description may use sequence of expressions and statements. The building process may be scoped, because during building, the symbolic description is partially constructed and ill-formed. When building completes, the scope is closed, and the process produces a well-formed and immutable symbolic description. One or more embodiments generate an error if it is not possible to build a well-formed description.

In an embodiment, a description is well-formed if it conforms to the structural constraints described above. Additional constraints may include, for example:

- a block may be required to include one terminal operation that is the last operation in the block;
- if a terminal operation refers to another block as a successor, the referenced block may be required to be a block in the same body;
- a terminal operation may be permitted to refer to any block in the body except the entry block;
- a value may be useable by an operation if that value dominates the operation.

Some constraints may be verified while building, whereas others may be easier to verify when (or may not be verifiable until) building has completed and before a well-formed description is returned.

After a description has been built, one or more embodiments perform further computation on the description, before the description is returned or lazily on demand. Such computations may include, for example: sorting all the blocks in reverse postorder (a useful order in which to traverse blocks when transforming); and computing immediate dominators (useful to verify dominance constraints).

One or more embodiments begin the building process by building a body. The scope is opened by calling a factory method to create an instance of the Body.Constructor class, passing in a method type descriptor as an argument that describes the return type of the body, and the arity and types of the body's entry block parameters.

FIG. 7A illustrates an example of source code 700 to create a body constructor whose constructed body will have a return type of int and whose entry block will contain two block parameters each of type int. Given a body constructor, one or more embodiments can obtain a block builder associated with the entry block, an instance of Block.Builder. The block builder API may be the primary API used to build descriptions. The builder API also may be instrumental for transformation as discussed in further detail below.

From the block builder, one or more embodiments then append operations into the resulting entry block. Operations may be created by calling operation factory methods. FIG. 7B illustrates an example of source code 702 to create an entry block that adds two block parameters and returns the result.

One or more embodiments consider the add operation (addop) to be bound when it is appended to the block builder. Binding produces an operation result, which is added to the set of users of each operand value, thereby indicating that the operation result depends on the operand values. In an embodiment, this approach supports easier analysis of value dependencies. If the operation is a terminal operation that targets other blocks, then binding may result in adding the block as a predecessor to each of the other blocks. In an embodiment, this approach supports easier analysis of control flow.

From the block builder, one or more embodiments can create further blocks in the body, by creating new block builders. Terminal operations can refer to these blocks.

When building is complete, one or more embodiments close the scope of the body constructor, which also closes the scope of any associated block builders. Once closed, an exception will be thrown if the body constructor or any associated block builder is operated upon.

One or more embodiments close the scope of the body constructor when it is passed as an argument to an operation factory method.

FIG. 7C illustrates an example of source code 704 to create a function operation with the body previously constructed as described above. Internally, the function operation calls the Body.Constructor::construct method with a reference to itself. This call closes the scope of the body constructor, assigns the function operation as the parent of the body, and returns a Body which is assigned as a child of the function operation.

FIG. 7D illustrates an example of source code 706 that corresponds roughly to what a Java compiler may execute, using the builder API, when it transforms the Java method 708 of FIG. 7E into a symbolic description. In an embodiment, this form of the builder API is well-suited for use by the Java compiler, because it controls the building process. However, for a developer seeking to control the building process, one or more embodiments invert the control of the building process.

FIG. 7F illustrates an example of source code 710 for using an alternative factory method that mirrors the structure of the source code discussed above. The factory method returns a builder whose body method is called. This example implementation hides the creation of the body constructor and the entry block builder shown previously.

In an embodiment, the design pattern 712 illustrated in FIG. 7G generalizes to any operation that accepts one or more bodies.

FIG. 7H illustrates an example of source code 714 for building a description modeling the Java method "f" that includes an anonymous expression, in this case a lambda expression. In this example, the structure of building models the structure of code. In addition, the lambda expression captures the variable i. During building, the block parameter (also named i), is used as an operand of the add operation.

5.2. Transforming Symbolic Descriptions

One or more embodiments define a functional transformation that takes as input a built symbolic description and returns a newly built and transformed symbolic description. In an embodiment, the input description is immutable; it is not (and cannot be) modified, and nor can the resulting description.

In an embodiment, for a given input description, the transformation traverses the input description's bodies, blocks, and operations (in order). For each operation encountered in the input description, the operation and a corresponding block builder (for the resulting description) are passed to an operation transform function. The operation transform function may optionally map that operation to zero or more operations, by appending those operations to the given block builder. An operation transform function can copy the operation by appending it to the builder, or delete the operation by not appending it.

FIG. 7I illustrates an example of source code 716 for calling a transform method in accordance with one or more embodiments. In an embodiment, every operation (e.g., of type Op) implements a transform method that copies itself and transforms its bodies, if any. The CopyContext provides mappings between values in the input description and values built in the output description, and blocks in the input description and block builders in the output description. These techniques are discussed in further detail below. The OpTransformer is a functional interface representing the operation transform function, which may be implemented by a user to transform an operation.

FIG. 7J illustrates an example of source code 718 for an OpTransformer interface in accordance with one or more embodiments. The apply method returns a Block. Builder. The returned block builder is passed as the first argument to the apply method for the subsequent encountered operation (if any) in the input block that is currently being traversed. This approach supports the transformation function's ability to transform blocks, as discussed in further detail below.

To transform an operation, one or more embodiments call its transform method. As used herein, the term "transformation" may include producing an exact copy. Alternatively, transformations may require at least one change to the transformed SDL in comparison to the input SDL. FIG. 7K illustrates an example of source code 720 for transforming a function f by producing an exact copy. In this example, each operation is appended to the block builder, which is also returned on each call. All the operations are bound to the input description, which requires one or more embodiments to copy each operation, transform their respective bodies (if any), and then append the copied unbound result to the block builder.

In an embodiment, to perform a copy, the op method calls transform on the bound operation with the operation transform function, as may be done explicitly when transforming the function operation. FIG. 7L illustrates an example of source code 722 for transforming an operation in accordance with one or more embodiments. The input symbolic description tree is traversed via calls to transform operations, whereas newly added (unbound) operations are not traversed.

FIG. 7M illustrates an example of source code 724 in accordance with one or more embodiments, replacing calls to method foo with calls to method bar. This transform checks if the input operation is an instance CallOp and its call descriptor is associated with a call to the method foo; if so, it replaces it with a call to bar. One or more embodiments first map foo's arguments to bar's arguments. Because this example does not change the method arguments, is uses the copy context to obtain the output values associated with the input values, which are the operands to the call operation to foo. One or more embodiments then add a new call operation to bar, passing in bar's arguments. Finally, one or more embodiments replace foo's operation result with bar's operation result, by adding a value mapping in the copy context. For any other operation, one or more embodiments simply append the operation to the given block builder. The transformation replaces calls made directly in method fooCall and also indirectly in the lambda expression.

FIG. 7N illustrates an example of source code 726 in which the function operation implements the transformation, which may generalize to any operation with bodies. The function operation's transformation includes a transformation on its body, that returns a Body.Constructor. FIG. 7O illustrates an example of source code 728 for transforming a Body in accordance with one or more embodiments. As illustrated in the example source code 730 of FIG. 7P, this approach employs a transformation on the entry block builder with the given body-specifically, the method transformBody on Block.Builder, which is the transformation primitive the prior transformations are composed with.

5.2.1. Lowering Symbolic Descriptions

In an embodiment, extended (or higher-level) operations can lower themselves into core operations, transforming their bodies. FIG. 7Q illustrates an example of source code 732 that concisely expresses a transformation in accordance with one or more embodiments. A lowerable operation, which is an instance of Op.Lowerable, implements the lower method that accepts a block builder and returns a block builder. Thus, one or more embodiments can easily lower a lowerable operation into the current block builder, returning a new block builder from which to continue building from. The lowerable op applies similar transforms to its own bodies, to lower any nested operations that also need lowering.

FIG. 7R illustrates an example of source code 734 for a lower method implementation for a while operation, in accordance with one or more embodiments. The while operation includes two bodies; the first is associated with the predicate to test whether to continue the loop or exit, and the second is the loop body. To lower, one or more embodiments create new blocks associated with the two bodies and an exit block. From the current block, one or more embodiments branch to the loop header block. One or more embodiments then transform the predicate body into the header block, followed by transforming the loop body into the loop body block. In each case, one or more embodiments further lower any lowerable operations.

When lowering the predicate body, one or more embodiments replace any yield operation with a conditional branch, using the value that is yield's operand. On a true value, one or more embodiments branch to the body block. On a false value, one or more embodiments branch to the exit block.

Additionally, one or more embodiments bind (via the call to setBranchTarget) the exit and header blocks to the targets of any break and continue operations, respectively, that may occur in the loop body. This approach supports the lowering of those terminal operations to branch operations to the respective target. The exit block builder is returned from whichever further operations may be appended.

5.2.2. Inlining

One or more embodiments compose transforming and lowering to support the inlining of lambda expressions, closures, and functions. This approach may be useful, for example, in situations where the Java compiler is capable of building descriptions. Thus, rather than needing to write a potentially large volume of code to explicitly build descriptions, one or more embodiments rely on the compiler build the description from source, transform that description, and inline the result. In effect, this approach uses the source code as a template. In an embodiment, inlining builds on the transformation primitive Block.Builder::transformBody. FIG. 7S illustrates an example of source code 736 for building the function described above that adds two numbers. Instead of creating the add operation, one or more embodiments inline the description produced by the compiler when targeting the lambda expression to an instance of Quoted. The block arguments a and b are passed to the inline method as the arguments to the inlined operation's entry block parameters.

In an embodiment, inlining requires identifying return operations from the lambda, closure, or function, and replacing them with a desired operation supplied as input by the consumer. The example in FIG. 7S inlines the return operation directly. In other examples, a branch to another block may be required, and in such cases the inlined operation may first need to be lowered, ensuring that branching refers to a successor block in the same body; otherwise, the resulting description will be ill-formed.

6. Practical Applications, Advantages, and Improvements

An SDL representation of source code (e.g., Java source code) preserves language constructs that would otherwise be lost during compilation to bytecode (e.g., structural and type information), and can be retrieved at runtime. Thus, an API that generates SDL representations allows for more reflection operations than would otherwise be available.

In addition, SDL transformation may be useful in a variety of contexts. For example, the system may generate a differentiated program, optimized program, functionally similar program in a different programming language, etc., without requiring an ad-hoc solution. SDL generation may be added to the Java compiler (or another compiler applicable to another programming language) and/or provided as a standalone tool. The JVM (or another virtual machine applicable to another programming language) may be modified so that reflection operations are performed on the corresponding SDL representation, rather than on the bytecode. To access an existing SDL representation, the system may first use standard reflection to obtain the SDL representation. For example, to access the SDL representation of a method body (if present), the system may first obtain (in examples using Java) the java.lang.reflect.Method instance. The system may then query the reflective object for its SDL representation. Thus, one or more embodiments provide access to an API that supports a wide range of runtime functionality that is not otherwise a standard part of the development and runtime environments.

7. Computer Networks and Cloud Networks

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a “cloud network.”

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider’s applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term “entity” as used herein refers to a corporation, organization, person, or other entity). The network resources may be local to and/or remote from the premises of the particular group of entities. In a public cloud, cloud resources are provisioned for multiple entities that are independent from each other (also referred to as “tenants” or “customers”). The computer network and the network resources thereof are accessed by clients corresponding to different tenants. Such a computer network may be referred to as a “multi-tenant computer network.” Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant identifier (ID). Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Alternatively or additionally, each data structure and/or dataset, stored by the computer network, is tagged with a tenant ID. A tenant is permitted access to a particular application, data structure, and/or dataset only if the tenant and the particular data structure and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using HyperText Transfer Protocol (HTTP) messages and/or according to other communication protocols via Application Programming Interface (API) endpoints. Microservices may be managed and updated separately, written in different languages, and may be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In an embodiment, microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

8.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

In an embodiment, the trigger, when satisfied, may output data for consumption by the target microservice. In another embodiment, the trigger, when satisfied, outputs a binary value indicating that the trigger has been satisfied, and/or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

8.2. Actions

In an embodiment, a plugged-in microservice application may expose actions to the microservices manager. The exposed actions may receive, as input, data or an identification of a data object or location of data that causes data to be moved into a data cloud.

In an embodiment, the exposed actions may receive, as input, a request to increase or decrease existing alert thresholds. The input may identify existing in-application alert thresholds and whether to increase, decrease, or delete the threshold. Alternatively or additionally, the input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

In an embodiment, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to one embodiment, the techniques described herein are implemented by one or more special-purpose computing devices. The special-purpose computing device (s) may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 8:
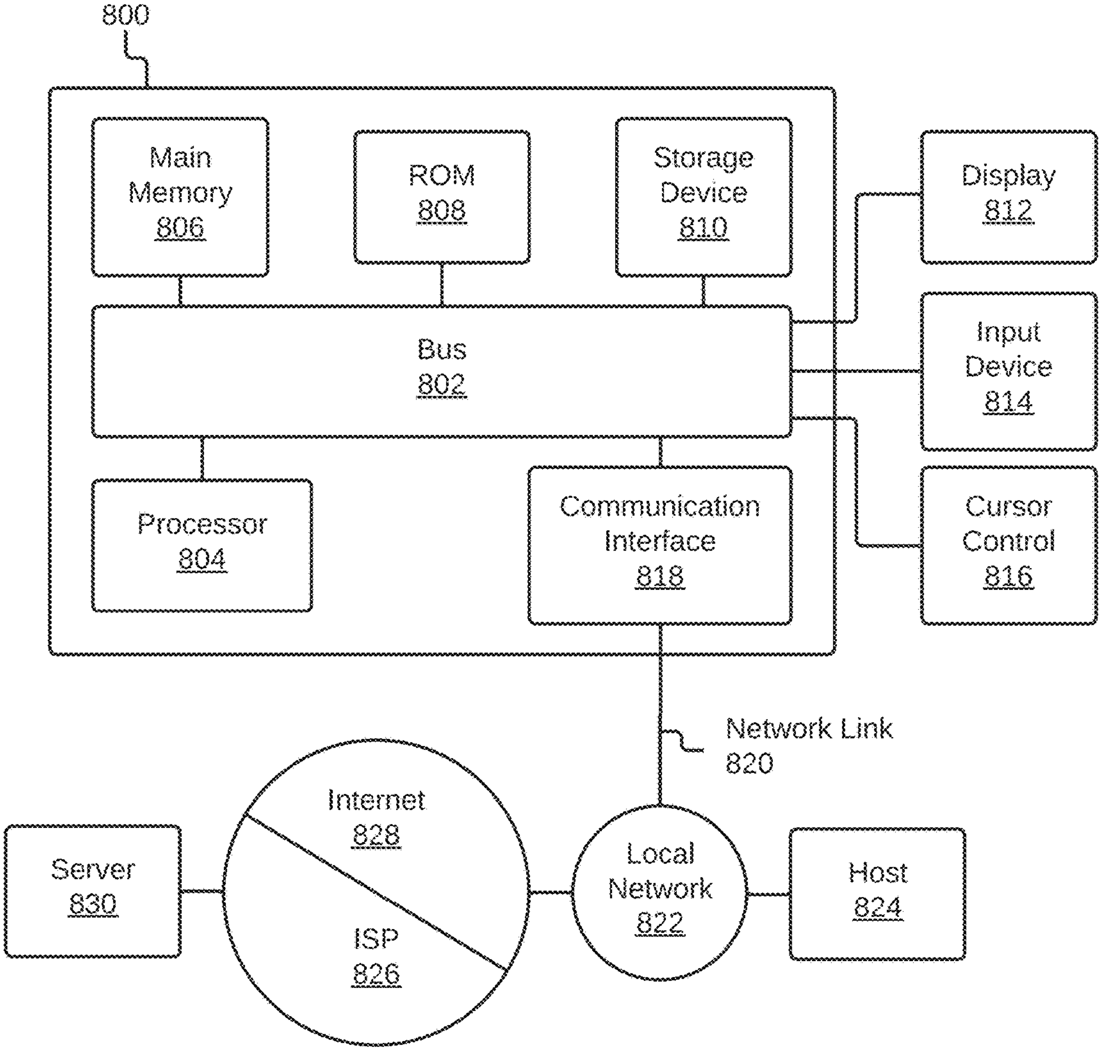
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to the processor 804, render computer system 800 into a special-purpose machine that is customized to perform the operations specified in the instructions.

Computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware, and/or program logic which in combination with computer system 800 causes or programs computer system 800 to be a special-purpose machine. In an embodiment, the techniques herein are performed by computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 810. Volatile media includes dynamic memory, such as the main memory 806. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of bus 802. Transmission media can also take the form of acoustic or light waves, such as those generated during radio wave and infrared data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its dynamic memory and send the instructions over a telephone line or other communications medium, using a modem. A modem local to computer system 800 can receive the data on the telephone line or other communications medium and use an infrared transmitter to convert the data to an infrared signal. An infrared detector can receive the data carried in the infrared signal and appropriate circuitry can place the data on the bus 802. The bus 802 carries the data to the main memory 806, from which the processor 804 retrieves and executes the instructions. The instructions received by the main memory 806 may optionally be stored on the storage device 810, either before or after execution by processor 804.

Computer system 800 also includes a communication interface 818 coupled to the bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card configured to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through a local network 822 to a host computer 824 or to data equipment operated by an Internet Service Provider (ISP) 826. The ISP 826 in turn provides data communication services through the world wide packet data communication network now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820, and communication interface 818. In the Internet example, a server 830 might transmit a requested code for an application program through the Internet 828, ISP 826, local network 822, and communication interface 818.

The received code may be executed by processor 804 as it is received, and/or may be stored in the storage device 810 or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:

receiving, by an application programming interface (API) from a source comprising one or more of a runtime process or a compiler, a first API call comprising a symbolic description language (SDL) representation of a set of source code;

determining, by the API based at least on the first API call, one or more transformations to perform on the SDL representation of the set of source code;

generating, by the API, a transformed SDL representation at least by performing the one or more transformations on the SDL representation of the set of source code;

supplying, by the API to the source responsive to the first API call, the transformed SDL representation;

performing, at runtime, one or more reflective operations using the transformed SDL representation.

2. The one or more non-transitory computer-readable media of claim 1, wherein the API comprises:

(a) a plurality of low-level API endpoints for performing low-level manipulations of SDL representations;

(b) a high-level API endpoint for performing composite manipulations of SDL representations, wherein the high-level API endpoint is configured to use the plurality of low-level API endpoints to perform the composite manipulations.

3. The one or more non-transitory computer-readable media of claim 2:

wherein receiving the first API call comprises receiving a call to the high-level API endpoint comprising the SDL representation of the set of source code;

wherein generating the transformed SDL representation comprises calling the plurality of low-level API endpoints to perform respective transformations in the one or more transformations on the SDL representation of the set of source code.

4. The one or more non-transitory computer-readable media of claim 1, wherein generating the transformed SDL representation comprises generating a new data structure comprising the transformed SDL representation, without directly modifying the SDL representation of the set of source code.

5. The one or more non-transitory computer-readable media of claim 1, wherein the one or more transformations comprises lowering the SDL representation from a high-level SDL dialect to a low-level SDL dialect.

6. The one or more non-transitory computer-readable media of claim 1, wherein the one or more transformations comprises inlining an SDL representation of an anonymous function.

7. The one or more non-transitory computer-readable media of claim 1, wherein the set of source code comprises Java source code.

8. The one or more non-transitory computer-readable media of claim 1:

wherein the source of the first API call is the compiler;

wherein the compiler is configured to compile the set of source code.

9. A system comprising:

one or more hardware processors;

one or more non-transitory computer-readable media; and program instructions stored on the one or more non-transitory computer-readable media which, when executed by the one or more hardware processors, cause the system to perform operations comprising:

receiving, by an application programming interface (API) from a source comprising one or more of a runtime process or a compiler, a first API call comprising a symbolic description language (SDL) representation of a set of source code;

determining, by the API based at least on the first API call, one or more transformations to perform on the SDL representation of the set of source code;

generating, by the API, a transformed SDL representation at least by performing the one or more transformations on the SDL representation of the set of source code;

supplying, by the API to the source responsive to the first API call, the transformed SDL representation;

performing, at runtime, one or more reflective operations using the transformed SDL representation.

10. The system of claim 9, wherein the API comprises:

(a) a plurality of low-level API endpoints for performing low-level manipulations of SDL representations;

(b) a high-level API endpoint for performing composite manipulations of SDL representations, wherein the high-level API endpoint is configured to use the plurality of low-level API endpoints to perform the composite manipulations.

11. The system of claim 9, wherein generating the transformed SDL representation comprises generating a new data structure comprising the transformed SDL representation, without directly modifying the SDL representation of the set of source code.

12. The system of claim 9, wherein the one or more transformations comprises lowering the SDL representation from a high-level SDL dialect to a low-level SDL dialect.

13. The system of claim 9, wherein the one or more transformations comprises inlining an SDL representation of an anonymous function.

14. The system of claim 9, wherein the set of source code comprises Java source code.

15. A method comprising:

receiving, by an application programming interface (API) from a source comprising one or more of a runtime process or a compiler, a first API call comprising a symbolic description language (SDL) representation of a set of source code;

determining, by the API based at least on the first API call, one or more transformations to perform on the SDL representation of the set of source code;

generating, by the API, a transformed SDL representation at least by performing the one or more transformations on the SDL representation of the set of source code;

supplying, by the API to the source responsive to the first API call, the transformed SDL representation;

performing, at runtime, one or more reflective operations using the transformed SDL representation;

wherein the method is performed by at least one device including a hardware processor.

16. The method of claim 15, further comprising:

receiving, by the API before receiving the first API call, a second API call comprising the set of source code;

generating, by the API responsive to receiving the set of source code, the SDL representation of the set of source code.

17. The method of claim 15, wherein the API comprises:

(a) a plurality of low-level API endpoints for performing low-level manipulations of SDL representations;

(b) a high-level API endpoint for performing composite manipulations of SDL representations, wherein the high-level API endpoint is configured to use the plurality of low-level API endpoints to perform the composite manipulations.

18. The method of claim 15, wherein generating the transformed SDL representation comprises generating a new data structure comprising the transformed SDL representation, without directly modifying the SDL representation of the set of source code.

19. The method of claim 15, wherein the one or more transformations comprises lowering the SDL representation from a high-level SDL dialect to a low-level SDL dialect.

20. The method of claim 15, wherein the one or more transformations comprises inlining an SDL representation of an anonymous function.

21. The method of claim 15, wherein the set of source code comprises Java source code.

* * * * *